United States Patent Office 3,591,646
Patented July 6, 1971

3,591,646
PROCESS FOR OBTAINING HALOGENATED, FLUORINE CONTAINING ORGANIC COMPOUNDS
Martino Vecchio, Milan, Italo Cammarata, Bollate, and Vittorio Fattore, Milan, Italy, assignors to Montecatini Edison S.p.A., Milan, Italy
No Drawing. Continuation-in-part of application Ser. No. 329,361, Dec. 10, 1963. This application Dec. 18, 1967, Ser. No. 691,214
Claims priority, application Italy, Dec. 28, 1962, 25,491/62
The portion of the term of the patent subsequent to Nov. 17, 1987, has been disclaimed
Int. Cl. C07c 17/08
U.S. Cl. 260—653.6                                    6 Claims

ABSTRACT OF THE DISCLOSURE

Continuous process for the preparation of chlorofluoroethanes by catalytic reaction in gaseous phase of acetylene, hydrogen fluoride and chlorine carried out in the presence of a recycle mixture of halogenated hydrocarbons at a temperature in the range from 250 to 500° C.

---

This application is a continuation-in-part of application Ser. No. 329,361 filed Dec. 10, 1963 and now abandoned.

The present invention relates to a process for obtaining chlorofluoroethanes by chlorofluorination of acetylene.

Some conventional methods for preparing chlorofluoroethanes consist in reacting a chlorinated hydrocarbon with hydrogen fluoride or with a mixture of hydrogen fluoride and chlorine in the presence of antimony halides.

Yet other processes involve catalytic fluorination or chlorofluorination in vapour phase of aliphatic halogen-containing compounds, having one or two carbon atoms by means of hydrogen fluoride or a mixture of hydrogen fluoride and chlorine.

The chlorofluoroethanes may also be obtained by reaction of aliphatic hydrocarbons or partially halogenated aliphatic hydrocarbons with oxygen, hydrogen fluoride and hydrogen chloride or chlorine in the presence of proper catalysts comprising a Deacon catalyst.

Some of the known processes suffer the disadvantage of requiring to be operated discontinuously or batchwise. Other processes use as starting materials compounds which already contain halogen atoms but such compounds are expensive and not easily available. A further drawback is represented by the low conversion of the reactants and by the low yields in the desired products.

Object of the present invention is to provide a process for chlorofluorinating acetylene.

A further object is to provide a process which may be readily controlled as far as the heat evolved during the reaction is concerned.

Another object is to provide a process capable of giving high yields in the desired products together with high conversions of the starting materials.

A not last object is to provide a process which proceeds at high reaction rates giving high outputs per unit of catalyst weight.

THE INVENTION

In accordance with the invention chlorofluoroethanes are prepared by continuously passing a feed mixture comprising acetylene, hydrogen fluoride, chlorine and a gaseous mixture of halogenated hydrocarbons at elevated temperature over a chlorofluorination or a fluorination catalyst for a contact time below 30 seconds.

The compounds which can be prepared with the process of the present invention may be either completely halogenated chlorofluorethanes or chlorofluorethanes which still contain hydrogen atoms.

Examples of completely halogenated chlorofluoroethanes are: $C_2F_5Cl$, $C_2F_4Cl_2$, $C_2F_3Cl_3$, $C_2F_2Cl_4$ and $C_2FCl_5$.

The temperature of the reaction can be varied within the limits of about 250–500° C. but preferably within the limits of 300–450° C.

The contact time may also be varied over a wide range and values as high as 30 seconds and as low as 0.5 second may be used. Preferably contact times in the range from 2 to 15 seconds are used.

The choice of a particular contact time depends, to a certain extent, on the other reaction conditions such as e.g. reaction temperature, catalyst, and molar ratios among reactants.

The catalysts employed in carrying out the process of the present invention are known chlorofluorination or fluorination catalyst; usually they are oxides and halides, particularly fluorides, of various metals.

Examples of catalysts are oxides, fluorides and chlorides of the following elements: Al, Cr, Zr, Th, rare earths metals, Fe, Ce, Co, Cu, Ga, Ni, Zn, Bi, Pb, Mn, V.

The catalysts can be associated with modifiers which enhance their activity. Examples of modifiers are fluorides of K, Na, Li, Cs, Ca, Mg, Sr, Ba.

The preferred catalysts for the present invention are oxides, halides, oxyhalides of Al, Cr, Zr and Th.

The catalysts may be employed in admixture with each other. The catalysts may also be supported on suitable carriers. Examples of carriers are $Al_2O_3$, $AlF_3$, $B_4C_3$, $CaF_2$, $SrF_2$, $BaF_2$, $MgF_2$ and carbon.

The catalysts to be employed in the process of the present invention are generally activated by means of a heat treatment, usually carried out at temperatures between 350 and 700° C., preferably between 400 and 500° C., in the presence of air or inert gases such as nitrogen, or by means of a thermal treatment, at temperatures between 250 and 600° C. in the presence of hydrogen fluoride and/or chlorine.

According to the present invention the chlorofluorination of acetylene is carried out in the presence of gaseous mixture of halogenated hydrocarbons.

The gaseous mixture of halogenated hydrocarbons which is fed to the reaction zone together with the other reactants is recovered from the reaction products mixture in the same amount and composition as it was fed to the reaction zone together with the other reactants. The mixture of halogenated hydrocarbons after being recovered is fed again to the reaction zone together with the other reactants.

Thus, the process of the invention is carried out continuously with a continuous recycle of the mixture of halogenated hydrocarbons which is continuously separated from the reaction products mixture and continuously fed to the reaction zone with the other reactants.

The amount and the composition of the recycle mixture are substantially the same during the whole process.

It has been discovered that the composition of the recycle mixture has a strong influence on the yields of the various chlorofluoroethanes which are obtained in the process of the invention.

It has further been discovered that it is possible, by varying the composition of the recycle mixture, to orient the chlorofluorination of acetylene towards the production of one or the other of the possible various chlorofluoroethanes.

For instance, while the reaction parameters such as catalyst, temperature, contact time and molar ratios among acetylene and chlorine are maintained substantially constant, it is possible, by simply varying the composition of the recycle mixture and the amount of hydrogen fluoride to produce either a mixture of chlorofluoroethanes consisting predominantly of $C_2Cl_2F_4$ or a mixture consisting of $C_2Cl_2F_4$ and $C_2Cl_3F_3$ in substantially equal proportions or a mixture containing a predominant quantity of $C_2Cl_3F_3$.

It has now been discovered that the gaseous mixture of halogenated hydrocarbons accomplishes another important task.

In the process of the invention reactions are involved which are strongly exothermic so that large amounts of heat are to be removed in order to keep the reaction temperature at the desired value and to avoid overheating of the reaction zone and of the catalyst therein contained.

The gaseous mixture of halogenated hydrocarbons fed to the reaction zone together with the other reactants, helps in removing the reaction heat.

The amount of heat which can be so removed depends on the ratio between the amount of the mixture of halogenated hydrocarbons and the amount of acetylene fed to the reactor.

It is even possible, by properly adjusting the amount of halogenated hydrocarbons per mole of acetylene, to remove completely the reaction heat and consequently carry out the process under adiabatic conditions, that is, without requiring any cooling from outside the reactor.

The mixture of halogenated hydrocarbons which, according to the present invention, is introduced in the reaction zone together with the other reactants consists mainly of halogenated aliphatic hydrocarbons having one or two carbon atoms.

Examples of these compounds are: $C_2Cl_4$, $C_2H_2Cl_4$, $C_2FCl_5$, $C_2F_2Cl_4$, $C_2F_3Cl_3$, $C_2F_4Cl_2$, $C_2HCl_3$, $C_2Cl_6$, $C_2H_4Cl_2$, $C_2HCl_5$, $C_2H_3Cl_3$, $C_2FHCl_2$, $C_2FCl_3$, $C_2H_5Cl$, $C_2H_2Cl_2$, $C_2H_3F$.

This list has a merely indicative significance since many other compounds can be present in the recycle mixture.

Preferably, the recycle mixture consists of compounds which are formed inherently during the process itself as reaction intermediates, by-products or products of the chlorofluorination of acetylene.

The predominant constituents of the recycle mixture are $C_2Cl_4$, $C_2Cl_6$, $C_2FCl_5$, $C_2F_2Cl_4$, $C_2F_3Cl_3$ and $C_2F_4Cl_2$. However many other compounds may be present in the recycle mixture although they are present in minor amounts in comparison to the above listed principal constituents.

The molar ratio between the recycle mixture and acetylene may vary within wide limits depending on the chemical and physical parameters of the process such as catalyst, reaction temperature, contact time reaction apparatus design and so on.

It has been noted that the process according to the present invention may still be carried out at a molar ratio between recycle mixture and acetylene as low as 0.5. However, some disadvantages, even if of secondary importance, may result.

Thus it has been observed that operating with such a low ratio a rapid catalyst aging and a consequent poor conversion of hydrogen fluoride can take place. Also, because of the reduced quantity of recycling mixture and consequently its poor efficiency in dissipating the reaction heat, cooling devices would have to be used.

At molar ratios of 0.5 or higher (i.e. up to about 25 moles of recycle mixture per mole of acetylene) the reaction product mixture contains at least sufficient quantities of the compounds corresponding to those recycled to enable their diversion and reinsertion in the process stream at the reaction zone. No upper limit seems to exist for the molar ratio between the recycle mixture and acetylene except that arising from economical consideration. Thus it is desirable to maintain the molar ratio between the limits of substantially 0.5 to 25.

In fact, at ratios higher than 25 there is no improvement in the yields of the desired end products and in the conversions of the reactants while there is a necessity for greater capacity to process the higher quantities of gases in addition to other obvious inconveniences.

Molar ratios among acetylene, hydrogen fluoride and chlorine may be varied within wide limits depending on catalyst, reaction temperature, contact time etc. and on the particular chlorofluoroethane or mixture of chlorofluoroethanes which are to be obtained.

It has been observed that when molar ratios between chlorine and acetylene higher than 4 are used, chlorofluoroethanes completely halogenated are predominantly obtained, but when molar ratios lower than 4 are used, chlorofluoroethanes containing hydrogen atoms and chlorofluoroethylenes are predominantly obtained.

Molar ratios between chlorine and acetylene are generally within the limits of 3 to 6.

Molar ratios between hydrogen fluoride and acetylene are generally within the limits of 3 to 12.

The process of the present invention may be carried out at the atmospheric pressure but pressures lower or higher than the atmospheric pressure can be used.

Higher pressures are particularly advantageous inasmuch as they allow to attain higher productivity of the catalyst. When operating at higher pressures it is also possible to feed to the stripping tower the reaction product mixture while still under pressure and thus it is possible to use easily available cooling fluids, such as brine to cool the head of the tower.

The process according to the present invention can be carried out in a reactor in which the catalyst is arranged as a fixed or a fluid bed.

The reaction zone may consist in one single catalysis zone or it may consist in a number of catalysis zones which can operate under different reaction conditions.

The invention will be more fully described with reference to the following examples.

Example 1

An air current was passed for two hours over active alumina (commercially known as ALCOA F–10) at 500° C. Then while the temperature was maintained at 300° C., a stream of hydrogen fluoride was passed over the alumina for 2 to 6 hours until complete saturation was effected.

The material so obtained was then ground and impregnated with an aqueous solution of thorium tetrachloride monohydrate (75% by weight). After water had been evaporated the material was dried.

650 ml. of this fluorinated and impregnated alumina, of a particle size between 100 and 150 mesh were charged into a reactor suitable for carrying out catalytic reactions according to the fluid bed technique.

A stream of hydrogen fluoride was passed over the catalyst contained in the reactor and maintained at 400° C. during 4 hours.

Catalyst analysis showed 2% thorium tetrafluoride content. A gaseous mixture constituted of chlorine, hydrogen fluoride, acetylene together with a gaseous mixture of halogenated recycling hydrocarbons, according to the following molar ratios:

| | Moles |
|---|---|
| Chlorine | 4.1 |
| Hydrogen fluoride | 4.8 |
| Acetylene | 1 |
| Recycling mixture | 5.9 | was passed over the catalyst.

The recycling mixture had the following molar composition:

| | Percent |
|---|---|
| $CCl_3$—$CCl_3$ | 0.6 |
| $CCl_2$=$CCl_2$ | 36.4 |
| $CHCl_2$—$CCl_3$ | 0.1 |
| $CHCl$=$CCl_2$ | 0.4 |
| $CFCl$=$CCl_2$ | 1.2 |
| $CFCl_2$—$CCl_3$ | 2.2 |
| $CF_2Cl$—$CCl_3$ | 25.1 |
| $CF_2Cl$—$CFCl_2$ | 33.5 |
| $CF_2Cl$—$CF_2Cl$ | 0.3 |

During the reaction the reactor temperature was maintained at about 450° C. The time of residence of the gaseous mixture in the catalysis zone was 4 seconds.

The gaseous mixture at the reactor outlet was conveyed to a stripping tower whose head was cooled by means of a bath of trichloroethylene and "Dry Ice."

The mixture of halogenated hydrocarbons withdrawn from the bottom of the tower constitutes after evaporation the recycling mixture of halogenated hydrocarbons fed to the reactor together with the other reactants.

From the top of the tower a gaseous mixture emerged which was constituted of the reaction products and by-products; it was first washed with water, then with a 5% aqueous solution of sodium hydroxide, and finally condensed and analyzed by the chromatography in gaseous phase.

The following conversions were obtained:

| | Percent |
|---|---|
| Acetylene | 100 |
| Hydrogen fluoride | 84 |
| Chlorine | 97 |

The following yields of chlorofluorinated derivatives were obtained, said yields being calculated on the basis of the weight of acetylene:

| | Percent |
|---|---|
| $CF_2Cl$—$CF_2Cl$ | 97.0 |
| $CF_2Cl$—$CFCl_2$ | 1.2 |
| $CF_3$—$CF_2Cl$ | 0.3 |
| $CF_2Cl_2$ | 0.1 |
| $CF_3Cl$ | 0.8 |

Example 2

The following gaseous mixture was reacted in the same reactor, employing the same catalyst and under the same conditions described in the preceding example:

| | Moles |
|---|---|
| Chlorine | 4.2 |
| Hydrogen fluoride | 4 |
| Acetylene | 1 |
| Recycling mixture | 5.8 |

The recycling mixture of halogenated hydrocarbons had the following molar composition:

| | Percent |
|---|---|
| $CCl_3$—$CCl_3$ | 1.1 |
| $CCl_2$=$CCl_2$ | 43.2 |
| $CHCl_2$—$CCl_3$ | 0.2 |
| $CFCl$=$CCl_2$ | 1.2 |
| $CFCl_2$—$CCl_3$ | 3.9 |
| $CF_2Cl$—$CCl_3$ | 29.8 |
| $CF_2Cl$—$CFCl_2$ | 18.9 |
| $CF_2Cl$—$CF_2Cl$ | 0.2 |

The reaction temperature was 403° C. and the residence time 4 seconds.

The following conversions were attained:

| | Percent |
|---|---|
| Acetylene | 100 |
| Hydrogen fluoride | 85 |
| Chlorine | 96 |

The yields of chlorofluorinated derivatives, calculated on the basis of the weight of acetylene were as follows:

| | Percent |
|---|---|
| $CF_2Cl$—$CFCl_2$ | 56.7 |
| $CF_2Cl$—$CF_2Cl$ | 40.6 |
| $CF_3$—$CF_2Cl$ | 0.2 |
| $CF_2Cl_2$ | 0.4 |
| $CF_3Cl$ | 0.7 |

Example 3

Active alumina as employed in Example 1 was heated firstly at 500° C. for 2 hrs. in an air stream, then heated at 300° C. in an hydrogen fluoride stream for some hours until complete saturation was effected. The resulting material was then ground and sieved.

650 ml. of the catalyst so obtained, of size comprised between 100 and 150 mesh were introduced into the same reactor as in Example 1 and were activated by treatment with hydrogen fluoride at 400° C. for 2 hrs.

Working as in Example 1 a gaseous mixture of chlorine, hydrogen fluoride, acetylene and a recycling mixture of halogenated hydrocarbons according to the following molar ratios was passed over the catalyst:

| | Moles |
|---|---|
| Chlorine | 4.2 |
| Hydrogen fluoride | 3.6 |
| Acetylene | 1 |
| Recycling mixture | 6 |

The recycle mixture of halogenated hydrocarbons had the following molar composition:

| | Percent |
|---|---|
| $CCl_3$—$CCl_3$ | 1.2 |
| $CCl_2$=$CCl_2$ | 50.1 |
| $CHCl_2$—$CCl_3$ | 0.2 |
| $CHCl$=$CCl_2$ | 0.3 |
| $CFCl$=$CCl_2$ | 0.8 |
| $CFCl_2$—$CCl_3$ | 4.1 |
| $CF_2Cl$—$CCl_3$ | 34.2 |
| $CF_2Cl$—$CFCl_2$ | 7.7 |

The reaction temperature was 400° C. while the residence time in the catalysis zone was 4 seconds. Separation of the recycling mixture, collection of products and their analyses were carried out as set forth in Example 1.

The following conversions were attained:

| | Percent |
|---|---|
| Acetylene | 100 |
| Hydrogen fluoride | 87 |
| Chlorine | 96 |

The yields of chlorofluorinated products, calculated on the basis of the weight of acetylene, were as follows:

| | Percent |
|---|---|
| $CF_2Cl$—$CFCl_2$ | 89 |
| $CF_2Cl$—$CF_2Cl$ | 8.1 |
| $CF_3$—$CF_2Cl$ | 0.3 |
| $CF_2Cl_2$ | 0.9 |
| $CF_3Cl$ | 0.8 |

Example 4

In this example the chlorofluorination of acetylene was carried out in the absence of any recycling mixture.

A stream of air was passed for two hours over alumina at 550° C.; then, while the temperature was maintained at 500° C., a stream of hydrogen fluoride was passed over the alumina until complete saturation was effected.

The so obtained catalyst was ground and 790 cc. of it having a particle size between 42 and 325 mesh were charged into a fluid bed reactor.

A gaseous mixture consisting of chlorine, hydrogen fluoride and acetylene in the following molar ratios

| | |
|---|---|
| Chlorine | 4.8 |
| Hydrogen fluoride | 3.9 |
| Acetylene | 1 | was passed over the catalyst at a temperature of 470° C. and for a contact time of 5.6 seconds.

The gaseous mixture at the reactor outlet was washed with water and then with a 5% aqueous solution of sodium hydroxide and finally condensed and analyed by gas chromatography.

The following conversions were obtained:

| | Percent |
|---|---|
| Acetylene | 99.8 |
| Hydrogen fluoride | 39.0 |
| Chlorine | 91.2 |

The following yields of chlorofluorinated derivatives were obtained, calculated with reference to the converted acetylene:

|  | Percent |
|---|---|
| CO | 9.5 |
| $CF_3Cl$ | 6.9 |
| $C_2F_5Cl$ | 0.1 |
| $C_2F_4Cl_2$ | 4.2 |
| $C_2F_3Cl_3$ | 16.0 |
| $C_2FCl_3$ | 2.8 |
| $C_2F_2Cl_4$ | 17.5 |
| $C_2Cl_4$ | 22.6 |
| $C_2FCl_5$ | 8.4 |
| $C_2Cl_6$ | 3.2 |

The conversion of acetylene to fluorinated products was 55.9%.

Example 5

A stream of air was passed for two hours over active alumina at 500° C.; then, while the temperature was maintained at 500° C., a stream of hydrogen fluoride was passed over the alumina until complete saturation was effected.

570 cc. of this catalyst of a particle size between 42 and 325 mesh were charged into a fluid reactor.

A gaseous mixture of chlorine, hydrogen fluoride, acetylene together with a recycling gaseous mixture of halogenated hydrocarbons was passed over the catalyst.

In Table I reaction temperature, contact time, molar ratios of the reactants and the molar composition of the recycling mixture are reported.

The reaction mixture at the reactor outlet was conveyed to a stripping tower the head of which was cooled by means of a bath of trichloroethylene and Dry-Ice.

A mixture of halogenated hydrocarbons was collected at the bottom of the tower. This mixture after evaporation constitutes the recycling mixture of halogenated hydrocarbons fed to the reactor together with the reactants.

From the top of the tower a gaseous mixture emerged which consisted of the reaction products and by-products; it was first washed with water and then with a 5% aqueous solution of sodium hydroxide and finally condensed and analyzed by gas chromatography.

In Table I reactants conversions and yields of chlorofluorinated derivatives calculated with reference to the converted acetylene are recorded.

Example 6

This example was carried out in the same apparatus and with the same technique described in Example 5. Reaction conditions and results are recorded in Table I.

The catalyst used was prepared by impregnating active alumina with an aqueous solution of $CoCl_2$.

The resulting mass was dried by heating it at 110° C. It had the following weight composition: $CoCl_2$ 10%, $Al_2O_3$ 90%. A current of air was passed for two hours over the catalyst at 500° C. then, while the temperature was maintained at 500° C., a stream of hydrogen fluoride was passed over the catalyst until complete saturation was effected. 620 cc. of the so obtained catalyst, having a particle size between 42 and 325 mesh were used.

Example 7

This example was carried out in the same apparatus and with the same technique described in Example 5. Reaction conditions and results are reported in Table I.

The catalyst was prepared by impregnating active alumina with an aqueous solution of $CuCl_2$. After drying the resulting mass had the following weight composition: $CuCl_2$ 10%, $Al_2O_3$ 90%.

A current of nitrogen was passed for one hour over the catalyst at 500° C. then, while the temperature was maintained at 500° C. a stream of hydrogen fluoride was passed over the catalyst until complete saturation was ef-

TABLE I

| Example | Temp., °C. | Contact time, sec. | Molar ratios | | | Composition of the recycling mixture, mole percent | | | | | | | | | Product yields with respect to converted acetylene, percent | | | | | | | Conversion of the reactants, percent | | |
|---|---|---|---|---|---|---|---|---|---|---|---|---|---|---|---|---|---|---|---|---|---|---|---|---|
| | | | Rec. mix/$C_2H_2$ | $Cl_2/C_2H_2$ | HF/$C_2H_2$ | $C_2F_5Cl$ | $C_2F_4Cl_2$ | $C_2F_3Cl_3$ | $C_2F_2Cl_4$ | $C_2FCl_5$ | $C_2Cl_6$ | $C_2Cl_3F$ | $C_2Cl_4$ | Not identified products | CO | $C_2F_5Cl$ | $CF_3Cl$ | $C_2F_4Cl_2$ | $C_2F_3Cl_3$ | $C_2H_2$ | $Cl_2$ | HF |
| 5 | 480 | 5.3 | 0.5 | 5.4 | 7.6 | | | 3.1 | 27.8 | 14.2 | 17.2 | 0.2 | 37.5 | | 0.1 | 0.5 | 0.7 | 2.9 | 81.4 | 99.8 | 93.2 | 40.1 |
| 6 | 470 | 5.2 | 6.0 | 3.9 | 4.1 | 0.1 | 1.3 | 28.2 | 30.3 | 6.2 | 7.6 | | 20.1 | 5.8 | 1.1 | 0.1 | 0.1 | 12.6 | 69.1 | 100 | 99.9 | 67.1 |
| 7 | 460 | 4.1 | 4.1 | 4.2 | 6.9 | | | 39.1 | 10.3 | 4.8 | 4.4 | 0.6 | 35.7 | 6.1 | 0.1 | 8.3 | 0.5 | 68.1 | 11.0 | 99.8 | 95.5 | 62.5 |
| 8 | 465 | 4.5 | 4.3 | 4.4 | 4.1 | | | 26.0 | 10.8 | 2.7 | 3.0 | 2.2 | 48.7 | 9.5 | 0.1 | 16.2 | 0.1 | 60.9 | 10.9 | 100 | 97.2 | 95.0 |
| 9 | 470 | 3.6 | 4.2 | 3.9 | 4.05 | | | 23.2 | 11.0 | 3.6 | 2.3 | 1.1 | 50.2 | 8.6 | | 14.1 | 1.1 | 42.6 | 31.9 | 99.8 | 99.9 | 83.8 | fected. 600 cc. of the so obtained catalyst, with a particle size between 42 and 325 mesh were used.

Example 8

This example was carried out in the same apparatus and with the same technique described in Example 5. Reaction conditions and results are reported in Table I.

The catalyst consisted in black chromium oxide. Over the catalyst maintained at 500° C. a current of air was passed for two hours and then a stream of hydrogen fluoride until a complete saturation was effected.

590 cc. of the so obtained catalyst, having a particle size between 42 and 325 mesh were used.

Example 9

This example was carried out in the same apparatus and with the same technique described in Example 5. Reaction conditions and results are reported in Table I.

The catalyst was prepared by impregnating active alumina with an aqueous solution of $Zr(NO_3)_4$. After drying the resulting mass had the following weight composition: $Zr(NO_3)_4$ 9.5%, $Al_2O_3$ 90.5%. Over the catalyst, maintained at 550° C. a current of air was passed for two hours then, at 500°, a stream of hydrogen fluoride until a complete saturation was effected.

590 of the obtained catalyst, having a particle size between 42 and 325 mesh was used.

Examples 10–13

410 g. of $(NH_4)_2Cr_2O_7$ were dissolved in 350 cc. of distilled water to obtain a saturated solution at 60° C.

1000 g. of allumina (grade A sold by the Dutch firm Ketjen) were impregnated with this solution. The mixture, after drying at 400° C. contained 24.6 weight part of Cr per 100 of $Al_2O_3$.

The resulting mass was activated by heat treatment under a stream of air for 2.5 hours at 300–500° C. and then fluorinated with hydrogen fluoride for 10 hours at 250–320° C. 2754 g. of HF were used.

Examples 10–13 were carried out with the above described catalyst in the apparatus and with the technique described in Example 5. Reaction conditions and results are reported in Table II.

Examples 14–18

148.5 g. of $CrCl_3 \cdot 6H_2O$ were dissolved in distilled water to obtain 410 cc. of solution. 1160 g. of alumina (grade B sold by the Dutch firm Ketjen) were impregnated with this solution.

The mixture, after drying at 110° for 14 hours, contained 26.5 weight parts of Cr per 100 parts of $Al_2O_3$.

The resulting mass was activated by heat treatment under a stream of air for 1.5 hours at 300–500° C. and then fluorinated with hydrogen fluoride for 8.5 hours at 250–370° C. 1830 g. of HF were used.

Examples 14–18 were carried out with the above described catalyst in the apparatus and with the technique described in Example 5. Reaction conditions and results are reported in Table II.

Examples 19–20

800 g. of alumina (grade A sold by the Dutch firm Ketjen) were activated by heat treatment under a stream of oxygen for 3.75 hours at 400–500° C. then they were fluorinated with hydrogen fluoride for 3.75 hours at 400–420° C. 1505 g. of hydrogen fluoride were used.

Examples 14–18 were carried out with the above described catalyst in the apparatus and with the technique described in Example 5.

Reaction conditions and results are reported in Table II.

We claim:

1. A continuous process for preparing chlorofluoroethanes which comprises the steps of:

(a) continuously passing a gaseous mixture consisting

TABLE II

| Example | Temp, °C. | Contact time, sec. | Molar ratios | | | Composition of the recycling mixture, weight percent | | | | | | | Product yields with respect to convert acetylene | | | | Conversion of the reactants | | |
|---|---|---|---|---|---|---|---|---|---|---|---|---|---|---|---|---|---|---|---|
| | | | Rec. Mix./$C_2H_2$ | $Cl_2/C_2H_2$ | $HF/C_2H_2$ | $C_2F_4Cl_2$ | $C_2F_3Cl_3$ | $C_2F_2Cl_4$ | $C_2FCl_5$ | $C_2Cl_6$ | $C_2Cl_4$ | $C_2F_5Cl$ | $C_2F_4Cl_2$ | $C_2F_3Cl_3$ | $C_2H_2$ | $Cl_2$ | HF |
| 10 | 300 | 6.0 | 4.4 | 4.0 | 4.3 | | 22 | 26 | 3 | | 49 | 0.7 | 45.9 | 51.2 | 100 | 99.6 | 79.8 |
| 11 | 300 | 3.1 | 4.1 | 4.3 | 3.6 | | 15 | 18 | 5 | 5 | 57 | | 6.7 | 92.1 | 100 | 92.2 | 23.7 |
| 12 | 300 | 3.1 | 4.1 | 4.3 | 5.1 | | 11 | 25 | 7 | 3 | 54 | | 6.7 | 92.4 | 100 | 93.6 | 53.6 |
| 13 | 300 | 3.0 | 2.1 | 4.0 | 5.5 | | 10 | 23 | 5 | | 62 | | 10.8 | 88.4 | 100 | 98.7 | 56.4 |
| 14 | 350 | 2.5 | 4.2 | 4.1 | 5.5 | | 18 | 25 | 3 | 1 | 53 | 1.1 | 49.5 | 48.7 | 100 | 98.1 | 79.5 |
| 15 | 350 | 2.5 | 4.4 | 4.2 | 3.4 | | 2 | 17 | 3 | 2 | 76 | 0.5 | 22.5 | 76.8 | 100 | 95 | 74.5 |
| 16 | 350 | 2.6 | 2.0 | 4.1 | 4.3 | | 9 | 34 | 5 | 2 | 50 | 1.1 | 42.7 | 56.1 | 100 | 96.4 | 78.6 |
| 17 | 350 | 2.5 | 4.0 | 4.1 | 8.0 | | 17 | 16 | 3 | 2 | 62 | | 11.2 | 86.2 | 100 | 91 | 49.6 |
| 18 | 350 | 2.6 | 6.1 | 4.4 | 5.5 | | 36 | 12 | 2 | | 48 | 2.2 | 21.1 | 77.4 | 100 | 99 | 57.7 |
| 19 | 400 | 0.5 | 4.1 | 4.2 | 4.6 | 3 | 21 | 25 | 2 | | 52 | | 63.5 | 34.3 | 100 | 94.3 | 80.2 |
| 20 | 400 | 3.1 | 4.1 | 4.0 | 4.8 | | 27 | 15 | 2 | | 53 | 11.6 | 87.8 | | 100 | 99.6 | 84.6 | of acetylene, hydrogen fluoride, chlorine and of a recycle mixture of halogenated hydrocarbons consisting essentially of chloroethylenes, chloroethanes, chlorofluoroethylenes and chlorofluoroethanes, the molar ratios of hydrogen fluoride: acetylene being within the range from 3 to 12 and the molar ratio of chlorine: acetylene being within the range from 3 to 6 through a reaction zone over a solid chlorofluorination or fluorination catalyst at a temperature from 250° to 500° C. for a catalyst contact time ranging between 0.5 and 30 seconds, to convert said gaseous mixture in a reaction products mixture (b) continuously separating said reaction products mixture into a recycle mixture, substantially equal in amount and composition to the recycle mixture passed over the catalyst together with acetylene, hydrogen fluoride and chlorine in step (a) and into a product consisting essentially of chlorofluoroethanes.

2. A process according to claim 1 wherein the mixture of halogenated hydrocarbons consists substantially of compounds selected from $C_2Cl_4$, $C_2Cl_6$, $C_2F_2Cl_4$, $C_2F_3Cl_3$, $C_2F_4Cl_2$ and $C_2FCl_5$.

3. A process according to claim 2 wherein the molar ratio between the recycle mixture of halogenated hydrocarbons and acetylene is in the range from 0.5 to 25.

4. A process according to claim 3 wherein the catalyst contact time is within the range from 2 to 15 seconds.

5. A process according to claim 3 wherein the catalyst consists of oxides, halides, oxyhalides of Al, Cr, Zr and Th.

6. A process according to claim 1 wherein the catalyst is selected from: calcinated and fluorinated alumina impregnated with $ThF_4$, calcinated and fluorinated alumina, calcinated and fluorinated alumina impregnated with $CoCl_2$, calcined and fluorinated alumina impregnated with $CuCl_2$, calcinated and fluorinated alumina impregnated with zirconium nitrate, calcinated and fluorinated alumina impregnated with ammonium dichromate, calcinated and fluorinated alumina impregnated with chromium chloride, calcinated and fluorinated black chromium oxide.

References Cited

UNITED STATES PATENTS

| | | | |
|---|---|---|---|
| 2,634,300 | 4/1953 | Hillyer et al. | 260—653.6 |
| 2,755,313 | 7/1956 | Calfee et al. | 260—653.6 |
| 2,946,827 | 7/1960 | Belf | 260—653.7 |
| 3,183,276 | 6/1965 | Vecchio et al. | 260—653.7 |
| 2,946,828 | 7/1960 | Scherer et al. | 260—653.7 |

FOREIGN PATENTS

| | | | |
|---|---|---|---|
| 640,486 | 7/1950 | Great Britain | 260—653.7 |
| 745,818 | 3/1956 | Great Britain | 260—653.7 |

DANIEL D. HORWITZ, Primary Examiner

U.S. Cl. X.R.

260—653.7